US011363287B2

(12) United States Patent
Cricri et al.

(10) Patent No.: US 11,363,287 B2
(45) Date of Patent: Jun. 14, 2022

(54) FUTURE VIDEO PREDICTION FOR CODING AND STREAMING OF VIDEO

(71) Applicant: Nokia Technologies Oy, Espoo (FI)

(72) Inventors: Francesco Cricri, Tampere (FI); Antti Hallapuro, Tampere (FI); Miska Hannuksela, Tampere (FI); Jani Lainema, Tampere (FI); Emre Aksu, Tampere (FI); Caglar Aytekin, Tampere (FI); Ramin Ghaznavi Youvalari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/973,620

(22) PCT Filed: Jul. 8, 2019

(86) PCT No.: PCT/FI2019/050535
§ 371 (c)(1),
(2) Date: Dec. 9, 2020

(87) PCT Pub. No.: WO2020/012069
PCT Pub. Date: Jan. 16, 2020

(65) Prior Publication Data
US 2021/0168395 A1    Jun. 3, 2021

(30) Foreign Application Priority Data
Jul. 9, 2018  (GB) ..................................... 1811197

(51) Int. Cl.
*H04N 7/18*    (2006.01)
*H04N 19/50*    (2014.01)
(Continued)

(52) U.S. Cl.
CPC ............... *H04N 19/50* (2014.11); *G06N 3/04* (2013.01); *G06N 3/08* (2013.01); *H04N 19/105* (2014.11);
(Continued)

(58) Field of Classification Search
CPC ...... H04N 19/50; H04N 19/105; H04N 19/14; H04N 19/154; H04N 19/172;
(Continued)

(56) References Cited

U.S. PATENT DOCUMENTS

2016/0378863 A1* 12/2016 Shlens .................. G06F 16/783
707/769
2017/0123215 A1*  5/2017 Li ........................... G06F 3/038
(Continued)

FOREIGN PATENT DOCUMENTS

EP          3310058 A1    4/2018
GB          2555431 A     5/2018
(Continued)

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Shan E Elahi
(74) *Attorney, Agent, or Firm* — Harrington & Smith

(57) ABSTRACT

Video data is obtained or received. At least a current frame or previous frame(s) of the obtained or received video data are provided to an input of a neural network. A predicted output is generated at an output of the neural network. The predicted output includes at least one of predicted future frame(s) of the video data and predicted properties of future frame(s) of the video data. Processing decision(s) are deter-
(Continued)

mined based, at least in part, on the predicted output. The current frame of the video data is processed at least partially according to the processing decision(s).

19 Claims, 10 Drawing Sheets

(51) Int. Cl.
| | |
|---|---|
| H04N 19/105 | (2014.01) |
| H04N 19/14 | (2014.01) |
| H04N 19/154 | (2014.01) |
| H04N 19/172 | (2014.01) |
| H04N 19/196 | (2014.01) |
| G06N 3/04 | (2006.01) |
| G06N 3/08 | (2006.01) |

(52) U.S. Cl.
CPC ........... *H04N 19/14* (2014.11); *H04N 19/154* (2014.11); *H04N 19/172* (2014.11); *H04N 19/196* (2014.11)

(58) Field of Classification Search
CPC .. H04N 19/196; H04N 19/147; H04N 19/103; H04N 19/136; H04N 19/85; G06N 3/04; G06N 3/08; G06N 3/0445; G06N 3/084; G06N 3/0454; G06N 3/02
USPC ..................................................... 375/240.12
See application file for complete search history.

(56) References Cited

U.S. PATENT DOCUMENTS

| | | | | |
|---|---|---|---|---|
| 2018/0137389 | A1* | 5/2018 | Mathieu | G06N 3/0445 |
| 2019/0164313 | A1* | 5/2019 | Ma | G06T 7/70 |
| 2019/0188141 | A1* | 6/2019 | Ma | G06F 12/0875 |
| 2019/0340496 | A1* | 11/2019 | Kim | G06N 3/0454 |
| 2020/0186809 | A1* | 6/2020 | Mukherjee | G06T 9/002 |

FOREIGN PATENT DOCUMENTS

| | | | | |
|---|---|---|---|---|
| WO | 2017/036370 | A1 | | 3/2017 |
| WO | WO-2017036370 | A1 | * | 3/2017 ........... H04N 19/182 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

Cricri et al., "Video Ladder Networks", arXiv, Dec. 30, 2016, 7 pages.

"High Efficiency Video Coding", Series H: Audiovisual And Multimedia Systems, Infrastructure of audiovisual services—Coding of moving video, Recommendation ITU-T H.265, Feb. 2018, 692 pages.

Search Report received for corresponding United Kingdom Patent Application No. 1811197.1, dated Dec. 21, 2018, 3 pages.

International Search Report and Written Opinion received for corresponding Patent Cooperation Treaty Application No. PCT/FI2019/050535, dated Dec. 20, 2019, 15 pages.

Lu et al., "Flexible Spatio-Temporal Networks for Video Prediction", IEEE Conference on Computer Vision and Pattern Recognition, Jul. 21-26, 2017, pp. 2137-2145.

Doulamis, Anastasios, et al., "Content-based Video Adaptation in Low/Variable Bandwidth Communication Networks Using Adaptable Neural Network Structures", 2006 International Joint conference on Neural Networks, Jul. 16, 2006 , pp. 4037-4044.

Byeon, Wonmin, et al., "Context VP: Fully context-Aware Video Prediction", Cornell University Library, 201 Olin Library Cornell University Ithaca, NY, Oct. 23, 2017, 21 pages.

* cited by examiner

FUTURE VIDEO PREDICTION FOR CODING AND STREAMING OF VIDEO

RELATED APPLICATION

This application claims priority to PCT Application No. PCT/FI2019/050535, filed on Jul. 8, 2019, which claims priority to GB Application No. 1811197.1, filed on Jul. 9, 2018, each of which is incorporated herein by reference in its entirety.

FIELD

The present specification relates to processing video data based on predicted outputs from neural networks.

BACKGROUND

In live video encoding and transmission, a frame is processed (stored, encoded and/or transmitted) based on information relating to current and possibly previous frames. There remains a need for improvement current processing methods of video data.

SUMMARY

In a first aspect, this specification provides an apparatus comprising: means for obtaining or receiving video data (e.g. live video); means for providing a current frame and/or one or more previous frames of the video data to an input of a neural network; means for generating a predicted output at, or based on, an output of the neural network, wherein the predicted output comprises at least one of one or more predicted future frames of the video data and predicted properties of one or more predicted future frames of the video data; means for determining one or more processing decisions based, at least in part, on the predicted output; and means for processing the current frame of the video data at least partially according to the one or more processing decisions. Some embodiments further comprise means for training the neural network.

Some embodiments include means for transmitting the processed current frame of the video data to a receiver.

Some embodiments include means for encoding one or more predicted future frames of the video data for transmission to a/the receiver.

Processing the current frame of the video data may comprise generating residual information based on a difference between the current frame of the video data and an earlier prediction of the current frame. The said residual information may be transmitted to a/the receiver.

The processing decisions may include determining whether or not to store the current frame of the video data as a reference frame. Alternatively, or in addition, the processing decisions may include determining an encoding method for at least the current frame of the video data.

The one or more predicted future frames of the video data may comprise a plurality of sets of possible future frames. Each set may comprise one or more predicted future frames. Each of the plurality of sets of possible future frames may correspond to a different possible future.

Some embodiments further comprise means for transmitting information indicating data included in the processed current frame of the video data. Said information may include one or more of: that the processed current frame comprises the current frame of the video data; that the processed current frame comprises the current frame of the video data and one or more predicted future frames of the video data; that the processed current frame corresponds to a previously transmitted predicted future frame of the video data; and that the processed current frame comprises a residual between the current frame of the video data and a previous predicted future frame of the video data.

Some embodiments may further comprise means for determining receiver processing decisions based at least in part on the predicted output and the processing decisions and means for decoding the processed current frame of the video data according to the receiver processing decisions. The receiver processing decisions may include a decoding method. The processing decisions may include the selection of one (e.g. the best) neural network amongst M neural networks. The selection may be done, for example, by having a transmitter signal provide the information to the receiver, or by having a receiver independently select a neural network (e.g. the best neural network) based on how the neural networks perform on predicting the already-received frames.

The means may comprise: at least one processor; and at least one memory including computer program code, the at least one memory and the computer program code configured, with the at least one processor, to cause the performance of the apparatus.

In a second aspect, this specification describes a method comprising: obtaining or receiving video data; providing a current frame and/or one or more previous frames of the obtained or received video data to an input of a neural network; generating a predicted output at an output of the neural network, wherein the predicted output comprises at least one of one or more predicted future frames of the video data and predicted properties of one or more future frames of the video data; determining one or more processing decisions based, at least in part, on the predicted output; and processing the current frame of the video data at least partially according to the one or more processing decisions.

The processed current frame of the video data may be transmitted to a receiver.

The one or more predicted future frames of the video data for transmission to a/the receiver may be encoded.

The one or more predicted future frames of the video data may comprise a plurality of sets of possible future frames. Each set may comprise one or more predicted future frames. Each of the plurality of sets of possible future frames may correspond to a different possible future.

Some embodiments further comprise transmitting information indicating data included in the processed current frame of the video data.

Some embodiments may further comprise determining receiver processing decisions based at least in part on the predicted output and the processing decisions.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: obtaining or receiving video data; providing a current frame and/or one or more previous frames of the obtained or received video data to an input of a neural network; generating a predicted output at an output of the neural network, wherein the predicted output comprises at least one of one or more predicted future frames of the video data and predicted properties of one or more future frames of the video data; determining one or more processing decisions based, at least in part, on the predicted output; and processing the current frame of the video data at least partially according to the one or more processing decisions.

In a sixth aspect, this specification describes a computer-readable medium (such as a non-transitory computer-readable medium) comprising program instructions stored thereon for performing at least the following: obtaining or receiving video data; providing a current frame and/or one or more previous frames of the obtained or received video data to an input of a neural network; generating a predicted output at an output of the neural network, wherein the predicted output comprises at least one of one or more predicted future frames of the video data and predicted properties of one or more future frames of the video data; determining one or more processing decisions based, at least in part, on the predicted output; and processing the current frame of the video data at least partially according to the one or more processing decisions.

BRIEF DESCRIPTION OF THE DRAWINGS

Example embodiments will now be described, by way of non-limiting examples, with reference to the following schematic drawings, in which.

DETAILED DESCRIPTION

Encoding and transmission of live streaming video is challenging. As a captured frame is encoded before a next frame is available, the processing decisions for encoding, transmission or storage of frames may not be efficient.

Figure 1:
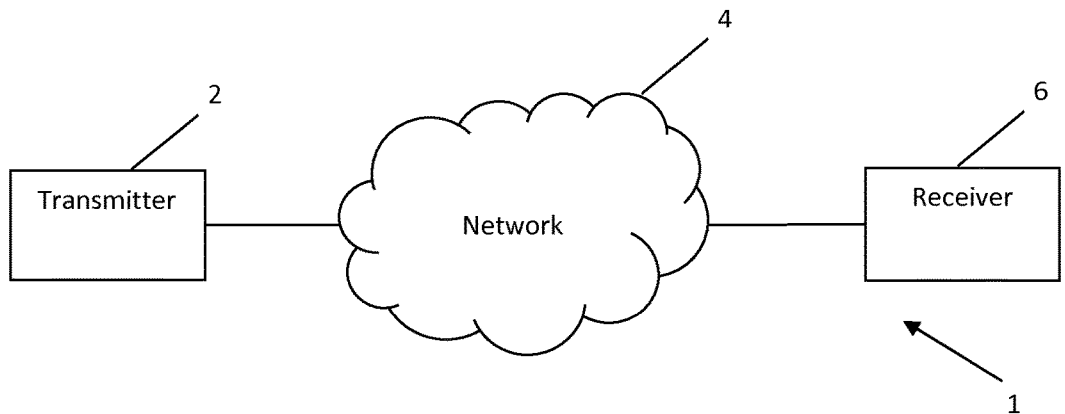
FIG. 1 is a block diagram of a video transmission environment.

FIG. 1 is a block diagram of a video transmission environment, generally indicated by the reference numeral 1, in accordance with an example embodiment. Transmitter 2 transmits video data to receiver 6 through network 4. The video data may be live streaming video obtained or received at the transmitter 2. The network 4 may be interconnected networks, such as the Internet. The receiver 6 may be a device capable of receiving and processing video data, such that the video may be displayed.

Figure 2:
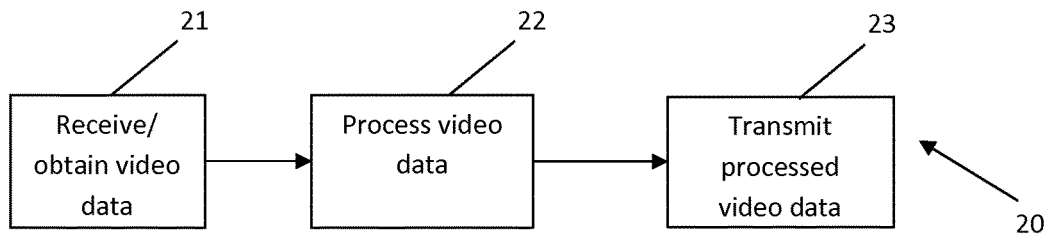
FIG. 2 is flow chart showing an algorithm in accordance with an example embodiment.

FIG. 2 is flow chart showing an algorithm, indicated generally by the reference numeral 20, in accordance with an example embodiment. The operations of algorithm 20 are performed at transmitter 2. At operation 21, transmitter 2 receives or obtains video data. The video data contains a plurality of frames. At operation 22, the plurality of frames of the video data is processed. The processed video data is transmitted to a receiver 6 at operation 23. The processed video data may be transmitted using a network interface of the transmitter 2. Further details of processing video data are discussed below.

Figure 3:
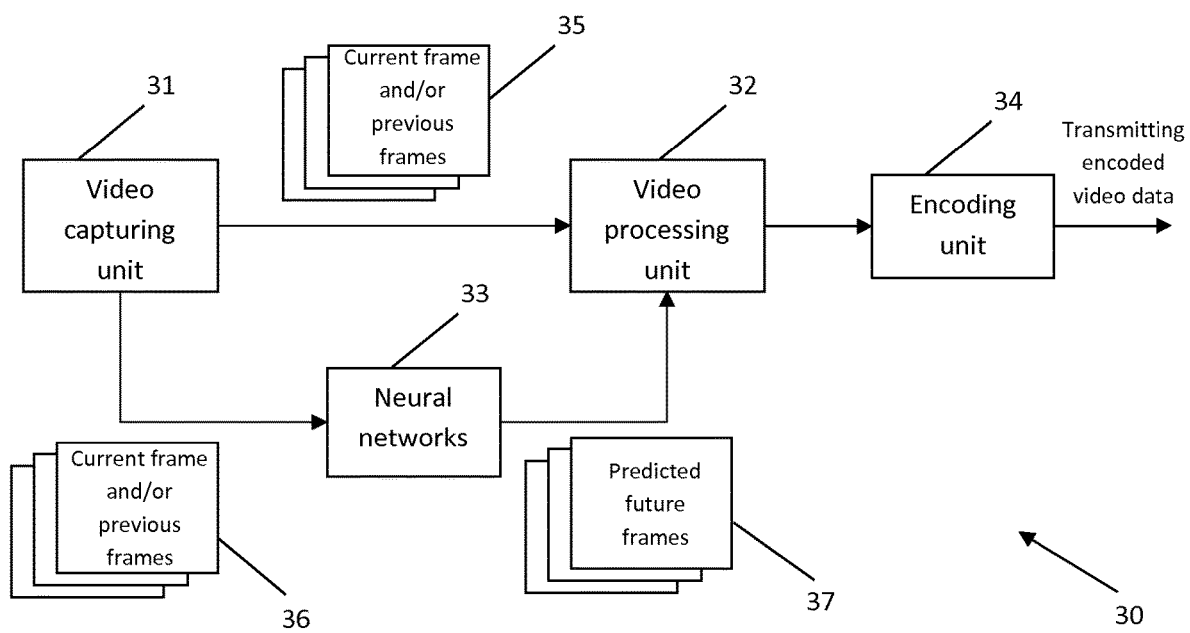
FIG. 3 is a block diagram of a system in accordance with an example embodiment.

FIG. 3 is a block diagram of a system, indicated generally by the reference numeral 30, in accordance with an example embodiment. System 30 illustrates a transmitter, similar to transmitter 2. System 30 comprises a video capturing unit 31, a video processing unit 32, neural networks 33, and an encoding unit 34. Video data is obtained or received at video capturing unit 31. Video capturing unit 31 may be a stand-alone camera connected to the transmitter 2. Alternatively, video capturing unit 41 may be a camera module within the transmitter 2. The video data may comprise a plurality of frames. When a current frame is received or obtained, the current frame and/or previous frames 35 are sent to the video processing unit 32 for processing of the current frame. Current frame and/or previous frames 36, which may be identical to current frame and/or previous frames 35, are provided to neural networks 33 as an input. A predicted output, comprising one or more predicted future frames 37, is obtained from the neural networks 33 as output, and is provided to the video processing unit 32. Video processing unit 32 determines processing decisions based at least partially on the predicted output. Encoding unit 34 then encodes the video data. An encoding method used for encoding the current frame may be selected based on the processing decisions determined by video processing unit 32. The video data is then transmitted to a receiver (such as the receiver 6 described above). In an example embodiment, the one or more future frames may correspond to one or more possible futures.

Figure 4:
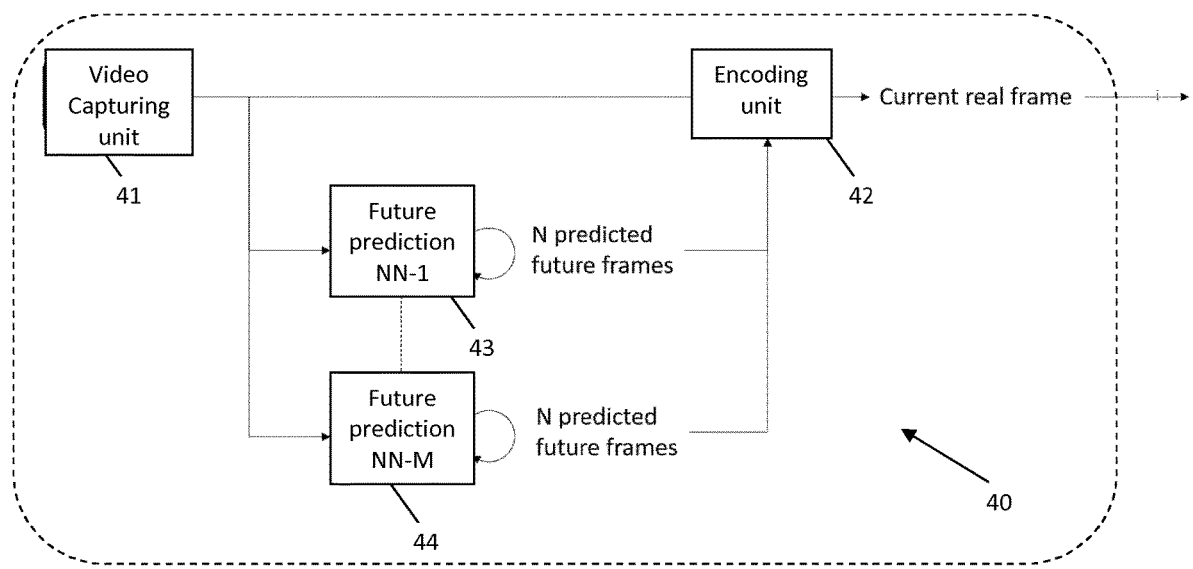
FIG. 4 is a block diagram of a system in accordance with an example embodiment.

FIG. 4 is a block diagram of a system, indicated generally by the reference numeral 40, in accordance with an example embodiment. System 40 illustrates a transmitter, similar to transmitter 2 and system 30. System 40 comprises a video capturing unit 41, similar to video capturing unit 31, and an encoding unit 42, similar to encoding unit 34. Video data is received or obtained from video capturing unit 41, and for each frame of the video data, one or more predicted future frames are generated. The one or more predicted future frames, similar to the one or more predicted future frames 37, may comprise one or more sets of predicted future frames. The one or more sets of predicted future frames are generated at one or more neural networks, and each set may correspond to a possible future. For example, at a first neural network 43 (future prediction NN-1), N number of predicted future frames are generated. There may be M number of neural networks, such that each of the M number of neural networks generates N number of predicted future frames. For example, an Mth neural network 44 (future prediction NN-M) generates N predicted future frames. The M sets of N predicted future frames are utilized for making processing decisions. Information from the neural networks is used by encoding unit 42 for selecting encoding method and processing a current frame. The current frame is encoded accordingly and transmitted to a receiver (such as the receiver 6 described above). The number of predicted future frames (N) generated at each neural network may or may not be the same. Furthermore, each neural network may generate one or more sets of predicted future frames. As such, the number of sets of predicted future frames may or may not be same as the number of neural networks.

Figure 5:
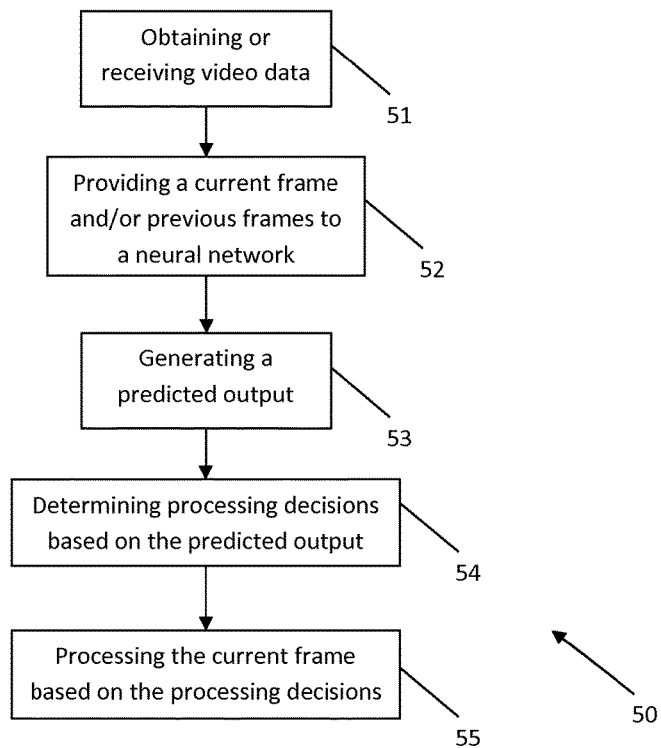
FIG. 5 is a flow chart showing an algorithm in accordance with an example embodiment.

FIG. 5 is flow chart showing an algorithm, indicated generally by the reference numeral 50, in accordance with an example embodiment. FIG. 5 may be viewed in conjunction with FIGS. 3 and 4 for better understanding. At operation 51, video data is obtained or received from the video capturing unit 31 or 41. At operation 52, a current frame of the video data and/or one or more previous frames of the video data are provided to neural networks 33, 43 and/or 44. At operation 53, a predicted output is generated at the neural network 33, 43 and/or 44. The predicted output may comprise one or more predicted future frames. At operation 54, video processing unit 32 or encoding unit 42 determines processing decisions based on the predicted output. At operation 55, video processing unit 32 or encoding unit 42 processes the current frame based on the processing decisions. The processing decisions and uses of the one or more predicted future frames are discussed in greater detail later in the specification.

In one example embodiment, a transmitter (such as the transmitter 2) is required to have enough computational, memory and power capabilities for running neural networks. In another example, the transmitter may make use of an external device, such as a server, for running the neural networks. In this case, the transmitter may not need to have the computational, memory and power capabilities for running neural networks, as the resources of the external device may be used for running the neural networks.

Figure 6:
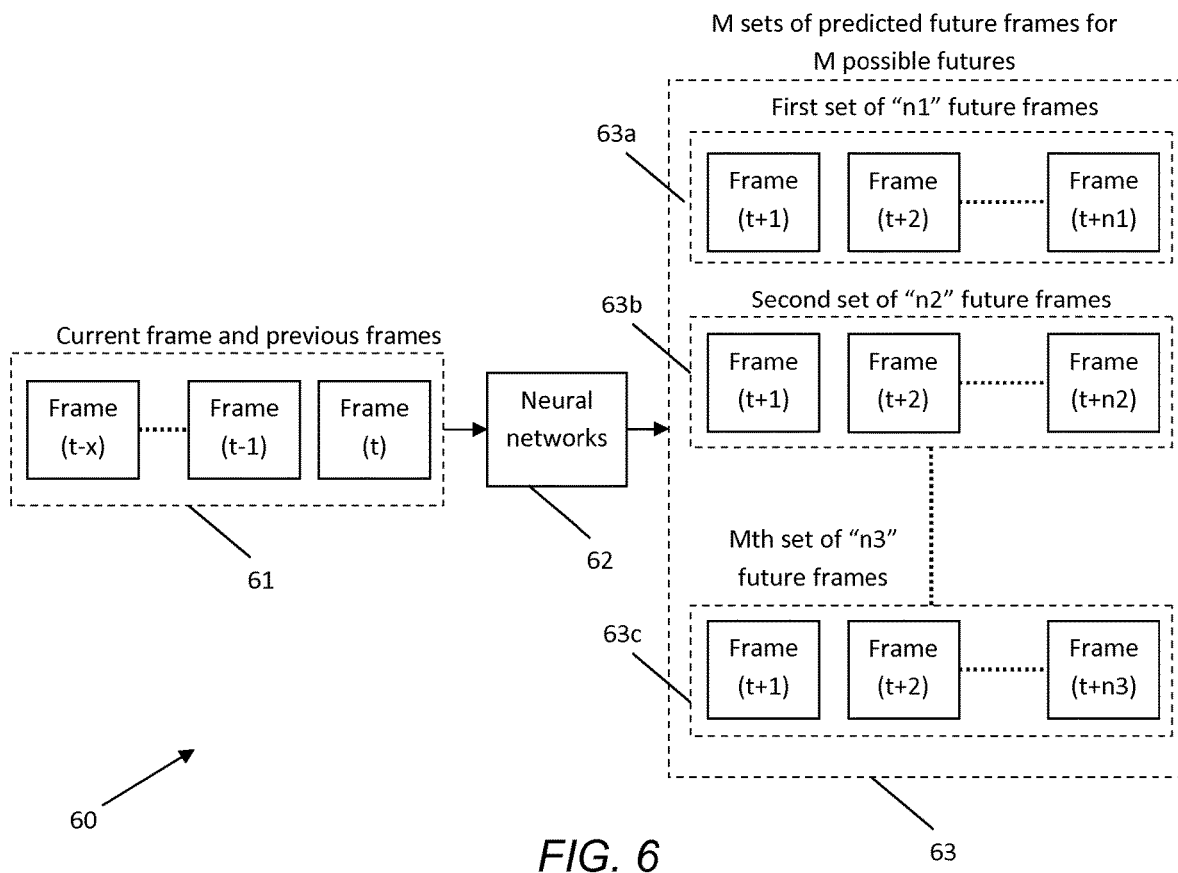
FIG. 6 is a block diagram showing example inputs and example outputs of a neural network in accordance with an example embodiment.

FIG. 6 is a block diagram showing example inputs and example outputs of a neural network, indicated generally by the reference numeral 60, in accordance with an example embodiment. Inputs to the neural networks 62, similar to the neural networks 33 described above, comprise current and previous frames 61. Current and previous frames 61 comprise a current frame, and optionally one or more previous frames. For example, Frame (t) is the current frame, frame (t−1) is a previous frame preceding frame (t), and frame (t−x) may be the last previous frame included in the input to the neural networks 62 with the frame (t). Neural networks 62 then generate predicted future frames 63, similar to predicted future frames 37. Predicted future frames 63 may comprise a plurality of sets of predicted future frames. For example, predicted future frames 63 may comprise M sets of predicted future frames. In the example embodiment, set 63a comprises a first set of predicted future frames, set 63b comprises a second set of predicted future frames, and set 63c comprises the Mth set of predicted future frames. Each set of predicted future frames may or may not have the same number of predicted future frames. For example, set 63a comprises "n1" predicted future frames. For example, frame (t+1) is the next frame following the current frame, frame (t). Frame (t+2) is the next frame following frame (t+1), i.e., the second frame following the current frame. Frame (t+n1) may be the last predicted future frame following the current frame that is provided in set 63a. Similarly, set 63b comprises "n2" predicted future frames.

As such, frame (t+n2) may be the last predicted future frame following the current frame that is provided in set 63b. Similarly, set 63c comprises "n3" predicted future frames. As such, frame (t+n3) may be the last predicted future frame following the current frame that is provided in set 63c. The number of predicted future frames, i.e. n1, n2, and n3, in each of the sets of predicted future frames, may or may not be equal.

In an example embodiment, the number of predicted future frames in each set of predicted future frames may be based on a complexity analysis of a scene of the corresponding possible future of the video data. If the scene is determined to be more complex, the number of predicted future frames in a set of predicted future frames may be higher. For example, a scene corresponding to a first set (63a) of predicted future frames is determined to be more complex than a scene corresponding to a second set (63b) of predicted future frames.

Therefore, the number (n1) of predicted future frames in set 63a may be higher than the number (n2) of predicted future frames in set 63b.

In an example embodiment, video processing unit 32 may select one of the plurality of sets of predicted future frames based on past frames. For example, the possible future corresponding to set 63a, generated by the first neural network, is determined to be the most plausible future. Set 63a may be selected if the first neural network is determined to provide the most plausible future. This can be determined by providing past frames, whose following future frames are already known, as inputs to all the neural networks. A neural network, which generates a first set of predicted future frames that is closest to the real following future frames, is selected for future predictions. Therefore, in this example, the first set of predicted future frames is selected for further processing. For determining which neural network generates a set of predicted future frames that are closest to the real following future frames, an error value can be derived for example by computing the mean squared error (MSE) between the real following frames and the set of predicted future frames. The motivation for this approach is that a neural network which has performed well in predicting the latest few frames is likely to predict well also in the future. In this example, the first neural network generates the first set of predicted future frames that is closest to the real following future frames.

In an additional embodiment, the M sets of possible futures with N possible future frames each may contain another set of P possible futures and T possible future frames, which provides a second level of prediction set and hence better control of the 2nd degree of future frame dependencies. Such a system can be extended to 3rd and even 4th level of future prediction. Thus, the future prediction blocks as shown in FIG. 4 can be extended to a second level, say, making future predictions of future predictions, like a tree. Such a tree of future prediction blocks could have any number of depth-levels.

Neural networks are parametric computation graphs consisting of units and connections. The units are usually arranged in successive layers, and in most neural network architectures only units in adjacent layers are connected. In feed-forward neural networks, which are the most common types of neural networks, a unit in one layer takes input from one or more units in one or more of the preceding layers, and provides its output to one or more units in one or more of the subsequent layers. Each connection has an associated parameter or weight, which defines the strength of the connection. The weight gets multiplied by the incoming signal in that connection. In fully-connected layers of a feedforward neural network, each unit in a layer is connected to each unit in the following layer. The signal which is output by a certain unit gets multiplied by the weight associated to the connection connecting that unit to another unit in the following layer. The latter unit then may perform a simple operation such as a sum of the incoming weighted signals. In addition to fully-connected layers, there are different types of layers, such as convolutional layers, non-linear activation layers, batch-normalization layers, pooling layers, etc.

The input layer receives the input data, such as images, and the output layer is task-specific and outputs an estimate of the desired data, for example a vector whose values represent a class distribution in the case of image classification. Another example consists of outputting an image, which is a modified version of the input image. The "quality" of the neural network's output is evaluated by comparing it to ground-truth output data. This comparison would then provide a "loss" or "cost" function.

The connections' weights represent the biggest part of the learnable parameters of a neural network. Other learnable parameters may be for example the parameters of the batch-normalization layer.

The parameters are learned by means of a training algorithm, where the goal is to minimize the loss function on a training dataset. The training dataset is regarded as a representative sample of the whole data. One popular learning approach is based on iterative local methods, where the loss is minimized by following the negative gradient direction in multiple iterations, until a stopping criterion is met. Here, gradient refers to the gradient vector of the loss with respect to all learnable parameters. Computing the gradient on the whole dataset may be computationally too heavy, thus learning is performed in sub-steps, where at each step a mini-batch of data is sampled and gradients are computed from the mini-batch. This is regarded to as stochastic gradient descent. The gradients are usually computed by a back-propagation algorithm, where errors are propagated from the output layer to the input layer, by using the chain rule for differentiation. The computed gradients are then used to update the parameters of the network. However, other methods may be used for computing the gradients, such as methods based on reinforcement learning. After a full pass over the training dataset, the process is repeated several times until a convergence criterion is met, usually a generalization criterion. An example of generalization criterion consists of monitoring the performance of the neural net on a held-out validation set, and stopping the training process when the error on the validation set has not changed more than a certain threshold for more than a certain number of training iterations. Another example of generalization criterion, again based on monitoring the validation set error, consists of stopping the training process when the validation error starts increasing.

In an example embodiment, a transmitter, similar to transmitter 2 comprises one or more neural networks performing future video generation/prediction or predicting certain properties or features of future video frames. Each of these networks may be based simply on convolutional neural networks, on recurrent neural networks or on a combination of convolutional and recurrent neural networks, or on capsule networks. Such neural networks usually take one or more past frames as their input, and provide one or more predicted future frames as their output. These predicted future frames may not be entirely same as real future frames, due to stochasticity in the real world, but they represent a possible future.

Figure 7:
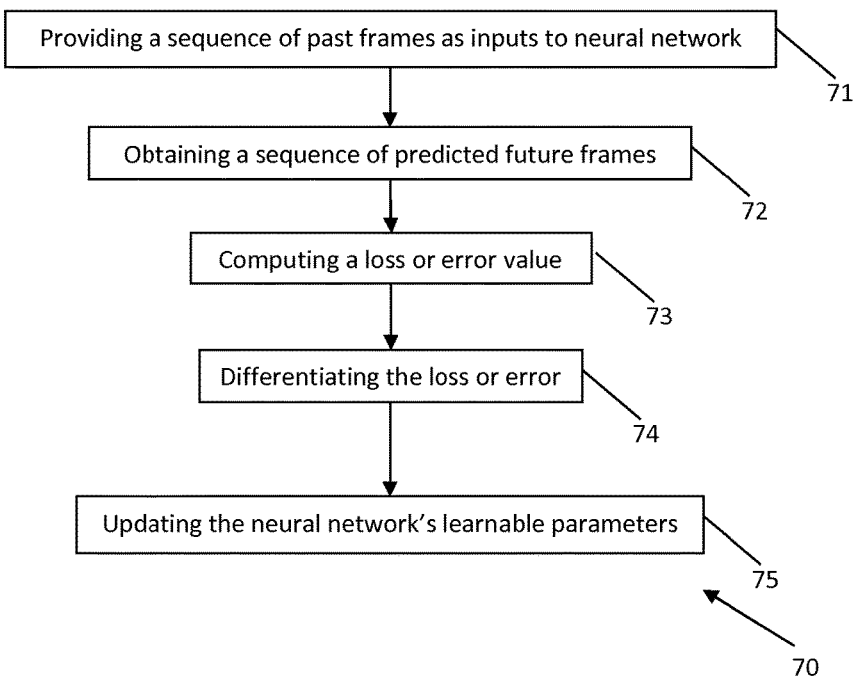
FIG. 7 is a flow chart showing an algorithm in accordance with an example embodiment.

FIG. 7 is a flow chart showing an algorithm for training a neural network, indicated generally by the reference numeral 70, in accordance with an example embodiment. The training of the neural networks, similar to neural networks 33, 43, 44 and 62, is performed offline in this example embodiment. The neural networks may be trained on a large collection of video data, so that the neural networks can learn, for example, what are the most plausible actions and movements of humans and objects, or relative movements between scene and cameras such as those due to global camera motion, or video editing effects such as fade and dissolve.

A video may be divided in parts, where each part has two adjacent and non-overlapping sequences of frames: a sequence of past frames, used as input, and a sequence of future frames, used as target outputs. The sequence of future frames may represent ground-truth future frames. At operation 71, a sequence of past frames is provided to the neural network as inputs. At operation 72, a sequence of predicted future frames is obtained from the neural network. At operation 73, a loss or error value is calculated based on the sequence of future frames and the sequence of predicted future frames. At operation 74, the calculated loss or error value is differentiated with respect to the neural network's learnable parameters, and a gradient vector is obtained, where each element of the vector corresponds to the gradient of a certain learnable parameter. At operation 75, the neural network's learnable parameters are updated based on the obtained gradient vector. This sequence of operations at algorithm 70 may be repeated for a plurality of iterations, until a convergence criterion is met. The convergence criterion may be based on prediction accuracy computed on a held-out validation dataset. After the training stage of the neural network, the neural network may be used for the inference stage, such as the process of FIG. 5.

In one example, for computing the loss or error value at operation 73, a mean squared error (MSE) or a cross-entropy loss may be used. Alternatively, a loss provided through an auxiliary neural network may be used. The auxiliary neural network may be a trained neural network that has been trained earlier. A MSE on features extracted from the auxiliary neural network may be used as the training loss. Alternatively, a loss derived from the output of an adversary neural network may be used as the training loss. The adversary neural network may be trained simultaneously, for example as in Generative Adversarial Networks.

In one example, differentiating the loss or error at operation 74 may be performed by using back-propagation or back-propagation through time. Alternatively or in addition, other methods derived from reinforcement learning literature may be used for obtaining the estimate of the gradient vector for the learnable parameters.

In one example, updating the neural network's learnable parameters at operation 75 may be performed using simple Stochastic Gradient Descent or one of its derived techniques such as Adam, RMSprop, or the like.

In one example, since there may be several possible futures in the real world, there may be more than one neural network for generating a plurality of sets of predicted future frames, as discussed earlier. The number of neural networks may or may not be the same as the number of sets of predicted future frames. For example, the neural networks generate M sets of predicted future frames, where each set comprises N predicted future frames, and height and width of each frame is H and W respectively. The M sets of predicted future frames may then be represented by an M×N×H×W shaped tensor. M may be a predefined number, or may be dynamically decided for every current frame. For example, if the neural networks initially generate a large number of sets of predicted future frames for a particular current frame, where many of the sets are determined to be similar to each other, fewer number of sets of predicted future frames are generated for following current frames. The similar sets of predicted future frames may be reduced to one set of predicted future frames, by clustering or any other suitable method. Similarity between the sets of predicted future frames may be determined based on factors such as MSE, or a distance value computed from an output of a trained neural network, such as a visual geometry group (VGG) neural network. For example, the distance value may be MSE.

In one example, in order to obtain a plurality of sets of future frames, a plurality of neural networks may be used, where the plurality of neural networks each have same topology, such as number and type of layers, and number of units per layer. The plurality of neural networks may also have the same training algorithm and same training data, but different weight initializations.

In another example, in order to obtain diversity in the plurality of neural networks, one or more properties of the plurality of neural networks may be configured to be different. The one or more properties may include architecture or topology (such as number and type of layers, number and type of units within each layer, etc.), weight initialization, training data, number of training iterations, training algorithm, and random seed. The random seed may be used for any stochastic process in the training stage and inference stage. The architecture or topology may be different based on different number of layers, different types of layers such as convolutional and recurrent, and different hyper-parameters of layers such as kernel size and number of convolutional channels. In a more specific example, diversity in the plurality of neural networks may be obtained by introducing stochasticity. An input current frame may be concatenated with a noise vector or noise tensor sampled from a certain probability distribution, for example a Gaussian distribution. By sampling the noise vector independently M times with different random seeds, the neural network would generate different future frames. Another way of introducing stochasticity is by adding the noise element-wise to the input current frame or to one or more of intermediate features or activations extracted by the neural networks. The example embodiments are not limited to any specific methods for introducing stochasticity, such that there may be other methods for adding stochasticity to neural network's training and inference stages.

In one example embodiment, training of the neural networks may be performed with online training. In online training, the neural networks may be continuously improved with new data, and possibly adapted to specific domains (e.g., sport events, concerts, etc.). In online training, the neural networks may be run at an inference stage in order to obtain predicted future frames to be used by the encoder. However, once the future frames (i.e., current frames of the future) are available, the future frames represent the ground-truth future frames with respect to the previous frames. Thus, the previous frames will be used as the input past frames, the current frames will be used as ground-truth future frames, and the network's weights can be updated with a training iteration. This may be referred to a form of online self-supervised training, as the ground-truth is obtained from the data itself and human annotation is not necessary. For the embodiments where the receiver also comprises video prediction neural networks, the receiver neural networks may be trained such that they are kept as similar as possible to the corresponding neural networks on the transmitter side.

This can be achieved by requiring the transmitter neural networks to use input frames and ground-truth future frames that were first encoded and then decoded. If, for some reason, such as communication network failure, the receiver fails to receive the ground-truth future frames, and determines to use predicted future frames in the inference stage, it may be preferred to stop the online training of the neural networks at both the transmitter and receiver, as the training may not be accurate. The receiver may send a signal to the transmitter to stop the online training and updating of neural networks for at least some of the following future frames. Alternatively, the transmitter may re-send the ground-truth future frames.

Referring back to FIG. 3 and FIG. 5, the processing decisions determined by the video processing unit 32 based on the predicted output may comprise any decisions relating to encoding and storage of the current frame, processing future frames, and analysing the video data.

Figure 8:
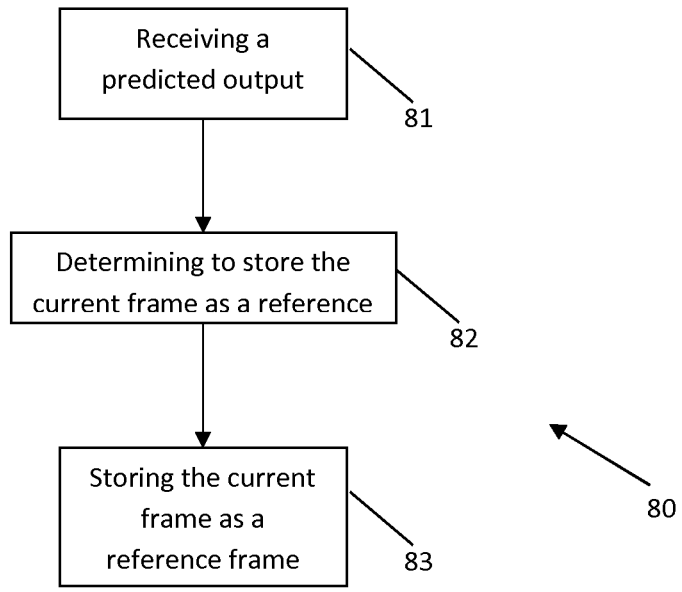
FIG. 8 is a flow chart showing an algorithm in accordance with an example embodiment.

In one example embodiment, the predicted output is used for determining whether or not the current frame should be stored in the memory as a reference frame, and/or which information of the current frame should be stored in the memory. FIG. 8 is a flow chart showing an algorithm, indicated generally by the reference numeral 80, in accordance with an example embodiment. At operation 81, the video processing unit 32 receives the predicted output from the neural networks 33. At operation 82, the video processing unit 32 determines, based on the predicted output, whether or not to store the current frame as a reference frame. At operation 83, the current frame is stored in the memory as a reference frame if it is determined to do so at operation 82. There may be various reasons why the current frame or part of the current frame may be determined to be stored in the memory as a reference frame.

In one example, if the video processing unit 32 determines from the predicted output that differences between the current frame and the predicted future frames are below a threshold, the current frame may be stored in the memory as a reference frame. This allows the video processing unit 32 to be able to calculate differences between the reference frame and any future frames. As such, when the future frames are received at the video processing unit 32 from the video capturing unit 31, the video processing unit 32 may only transmit residual information regarding the difference between the reference frame and one or more future frames to the receiver, rather than transmitting the whole of the future frames. This may reduce the size of the video data to be transmitted to the receiver, and hence may allow the video transmission to be more efficient.

In another example, information or parts of the current frame is stored in memory based on the predicted output, and may be used for encoding or decoding one or more future frames.

The information of the current frame may comprise a reconstructed reference frame and/or the motion field resulting from encoding or decoding the reference frame. The reconstructed reference frame is a frame obtained by encoding, and then decoding the reference frame. For example, the current frame may comprise a visual object whose different sides have different appearances, and a first side may be displayed in the current frame. It may be determined from the predicted output and predicted future frames that motion of the visual object is such that in at least one future frame, the first side of the visual object is displayed again. The video processing unit 32 may then determine to store the current frame and/or the part of the current frame comprising the appearance of the first side of the visual object in the memory. As such, the predicted output may be used by the video processing unit 32 to determine which current frame should be stored as a reference frame.

In another example, the video processing unit 32 determines at least part of signalling information to be transmitted to the receiver based on the predicted output. It is known that encoded video data is transmitted to the receiver along with signalling information, where the signalling information assists the receiver to determine processing decisions, especially decoding method. In this example, if the video processing unit 32 determines, based on the predicted output, that information in the current frame may be important for decoding one or more future frames, the signalling information may indicate the receiver to store the current frame in the receiver's memory in high quality, and that it may be useful for decoding certain one or more future frames. The receiver may also be indicated to store the current frame in the receiver's memory in high quality by including information in the signalling information that the current frame is a reference frame. Similar decisions and operations may be done in case the encoding and decoding is done at the block level, which is very common in practice.

Figure 9:
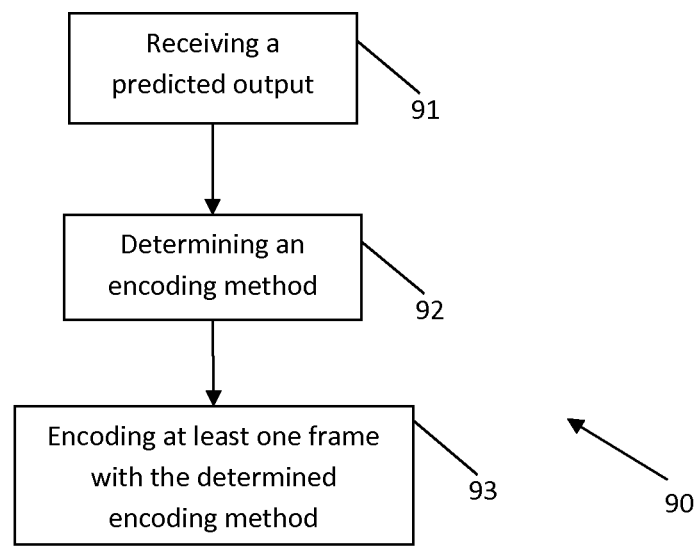
FIG. 9 is a flow chart showing an algorithm in accordance with an example embodiment.

In one example embodiment, the predicted output is used for determining an encoding method for the current frame and/or one or more future frames. FIG. 9 is a flow chart showing an algorithm, indicated generally by the reference numeral 90, in accordance with an example embodiment. At operation 91, the video processing unit 32 receives a predicted output from neural networks 33. At operation 92, the video processing unit 32 determines an encoding method for the current frame and/or one or more future frames based on the predicted output. At operation 93, the encoding unit 34 encodes the current frame and/or one or more future frames using the determined encoding method. There may be various ways for determining the encoding method based on the predicted output in order to optimize the encoding of the future frames. The selection of encoding method based on the predicted output may allow optimizing expected rate-distortion and coding complexity on the future frames In one example, if the video processing unit 32 determines, based on the predicted output, that information in the current frame may be important for decoding one or more future frames, the encoding unit 34 encodes the current frame or part of the current frame with high quality.

In another example, the predicted output is used by the video processing unit 32 to select coding tools that likely perform best when encoding future frames in order to optimize encoding and decoding performance and complexity of future frames. For example, if a scene transition is detected in the predicted future frames, video processing unit 32 allows the encoding unit 34 to use encoding methods suitable for scene transition when encoding the future frames.

In an example embodiment, the video processing unit 32 uses the predicted output for analysing predicted complexity of future frames, which may be in terms of bitrate versus distortion. The complexity of future frames may also be in terms of a function or data points of bitrate achieved with certain picture quality, for example peak signal-to-noise ratio. The information of the predicted complexity of future frames may be used for bitrate control decisions of the current frame. The bitrate control decisions may include which picture quality or which bitrate budget is selected for the current frame. The picture quality may be based on a quantization parameter.

In an example embodiment, the video processing unit 32 uses the predicted output for analysing whether the predicted future frames involve a scene transition. For example, the predicted output may indicate that the current frame is a part of a gradual scene transition, such as fading or dissolving, and that a future frame is also likely to be part of the same gradual scene transition. As the video data is predicted to have a scene transition into a new scene, it may be beneficial to encode a first frame of the new scene using intra-frame coding.

Intra-frame coding, or intra prediction uses adjacent pixels within the same frame, rather than using information from other frames. Furthermore, when a scene transition is detected, it is determined that the current frame has low importance for decoding future frames after a certain duration, and thus the video processing unit 32 may use a bitrate control decision to reduce the quality of the current frame.

In one example, when using a plurality of neural networks, and generating a plurality of sets of predicted future frames, some modifications or adaptations of the algorithm 50 may be required. The video processing unit 32 may determine which frame to mark as reference frame by running an expected rate-distortion optimization on all of the plurality of sets of predicted future frames. As a result, the current frame may be marked as a reference frame for one or more of the possible futures.

In one example embodiment, all algorithms discussed herein as example embodiments may be considered in multiview video coding scenarios as well, where the content capturing includes multi-camera setup. In such cases, the future frame generation for a certain view can use information from other view(s) in order to have efficient future frame(s) prediction operation. This is may be beneficial if there is object or scene motion from one view to another. In another example, the multiview information is used in single-layer coding scenarios. If the multiview information of the content is available but the encoding and decoding operations are required to be in single-layer coding schemes, the generation of the predicted output in the example embodiments may take into account the information from other views prior to encoding the current frames. However, this case must be limited to scenarios where the decoder-side future frame(s) prediction operation is not needed (i.e., decoder does not require to have generated future frames for decoding the content) or the predicted future frames are transmitted to decoder.

Figure 10:
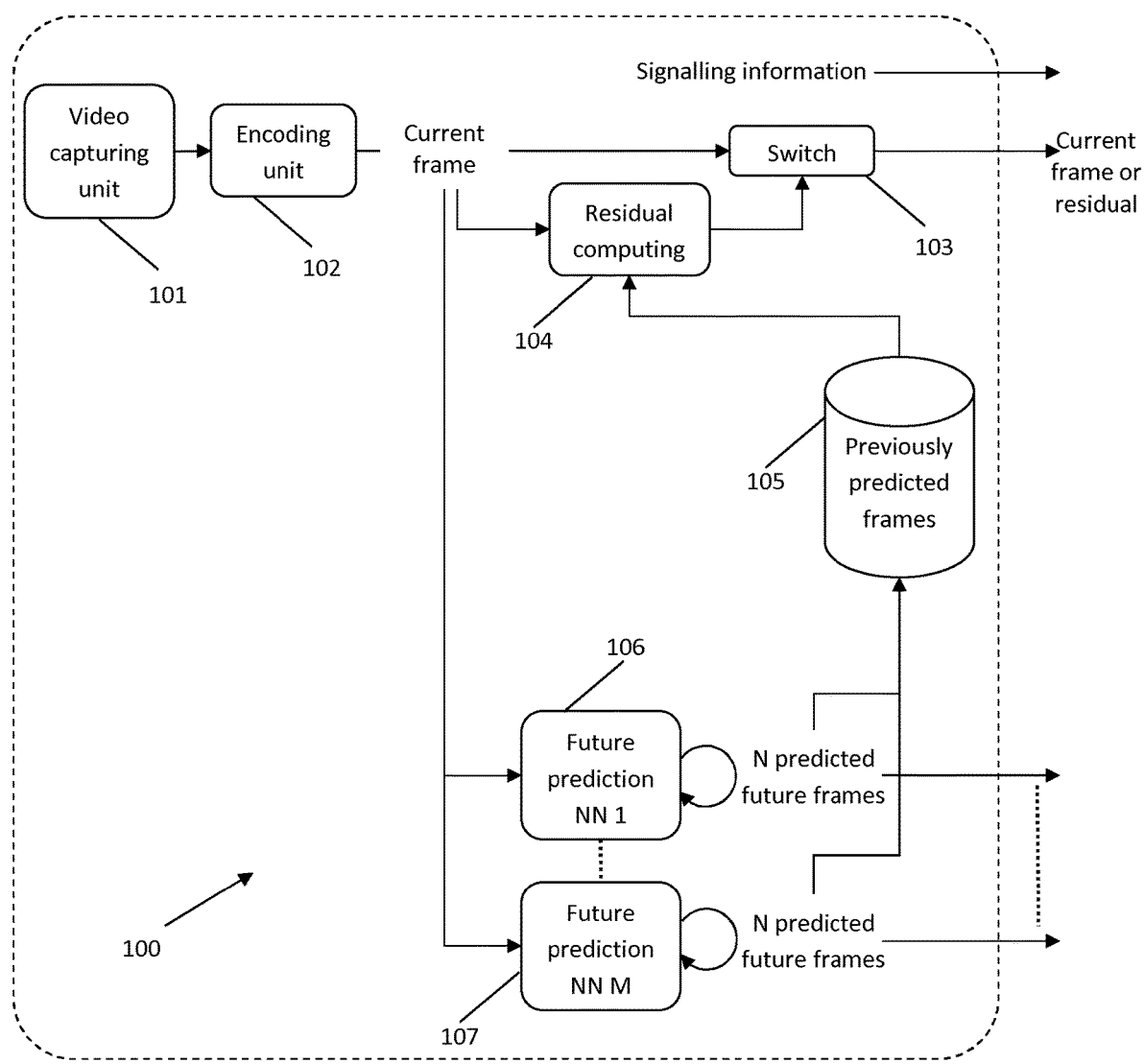
FIG. 10 is a block diagram of a system in accordance with an example embodiment.

In an example embodiment, the transmitter may encode the predicted future frames and send them to the receiver, in order to prepare for potential drop of connection. FIG. 10 is a block diagram of a system, indicated generally by the reference numeral 100, in accordance with an example embodiment. System 100 may illustrate a transmitter, similar to transmitter 2. System 100 comprises a video capturing unit 101, similar to video capturing units 31 and 41, an encoding unit 102, similar to encoding units 34 and 42, switch 103, a database 105 storing previously predicted frames, and a residual computing unit 104. The residual computing unit 104 may be comprised within a video processing unit, similar to video processing unit 32. Video data is obtained or received from the video capturing unit 101, and encoded by the encoding unit 102. A first current frame of the video data is encoded and transmitted to a receiver, similar to receiver 6. The first current frame is run through neural networks, and a plurality of predicted future frames are generated by the neural networks. The plurality of predicted future frames may comprise a plurality of (M) sets of future frames. For example, at a first neural network 106 (future prediction NN-1), N number of predicted future frames are generated, and an Mth neural network 107 (future prediction NN-M) generates N predicted future frames. The plurality of predicted future frames is transmitted to the receiver 6. The plurality of predicted future frames is stored in database 105, and the plurality of predicted future frames may represent earlier prediction(s) of following current frames, including a second current frame. The following current frames are frames following the first current frame. When a following current frame, for example the second current frame, is received from the video capturing unit, the residual computing unit 104 generates residual information. The residual information indicates the difference between the second current frame and an earlier prediction of the second current frame. The earlier prediction of the second current frame may be obtained from the plurality of predicted future frames that were generated for the first current frame. The second current frame or the residual information is then sent to the receiver 6 using switch 103. Switch 103 may be a multiplexer used for sending either the second current frame, or the residual information to receiver 6.

For example, switch 103 decides to send the second current frame or the residual information based on the network conditions. If the network conditions are good, the second current frame may be sent to the receiver 6. If the network conditions are not good enough, the residual information may be sent. The residual information is likely to comprise smaller amount of data compared to the second current frame. The signalling information comprises indication of whether the transmitted information contains: a current frame (such as the first current frame); a current frame and corresponding predicted future frames (such as the first current frame and the plurality of predicted future frames); a current frame corresponding to a previously transmitted predicted future frame (such as the second current frame); or a residual information (such as the difference between the second current frame and an earlier prediction of the second current frame).

Figure 11:
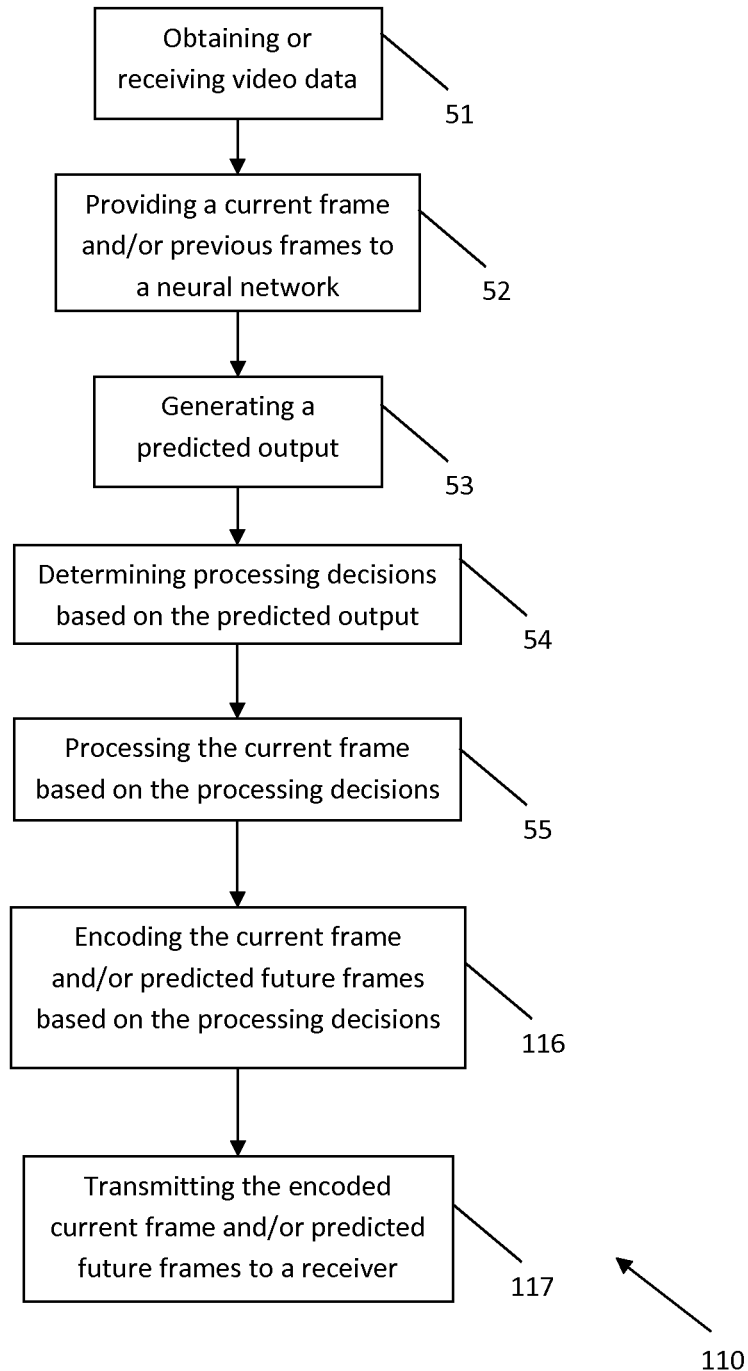
FIG. 11 is a flow chart showing an algorithm in accordance with an example embodiment.

FIG. 11 is a flow chart showing an algorithm, indicated generally by the reference numeral 110, in accordance with an example embodiment. Operations 51-55 are similar to operations 51-55 of FIG. 5, and may be interpreted similarly. At operation 116, the current frame and/or the predicted future frames are encoded based at least partially on the processing decisions determined at operation 55. At operation 117, the encoded current frame and/or encoded predicted future frames are transmitted to the receiver, similar to receiver 6. The decision of whether to transmit only the current frame or to transmit both the current frame and one or more predicted future frames is illustrated in greater detail below.

Figure 12:
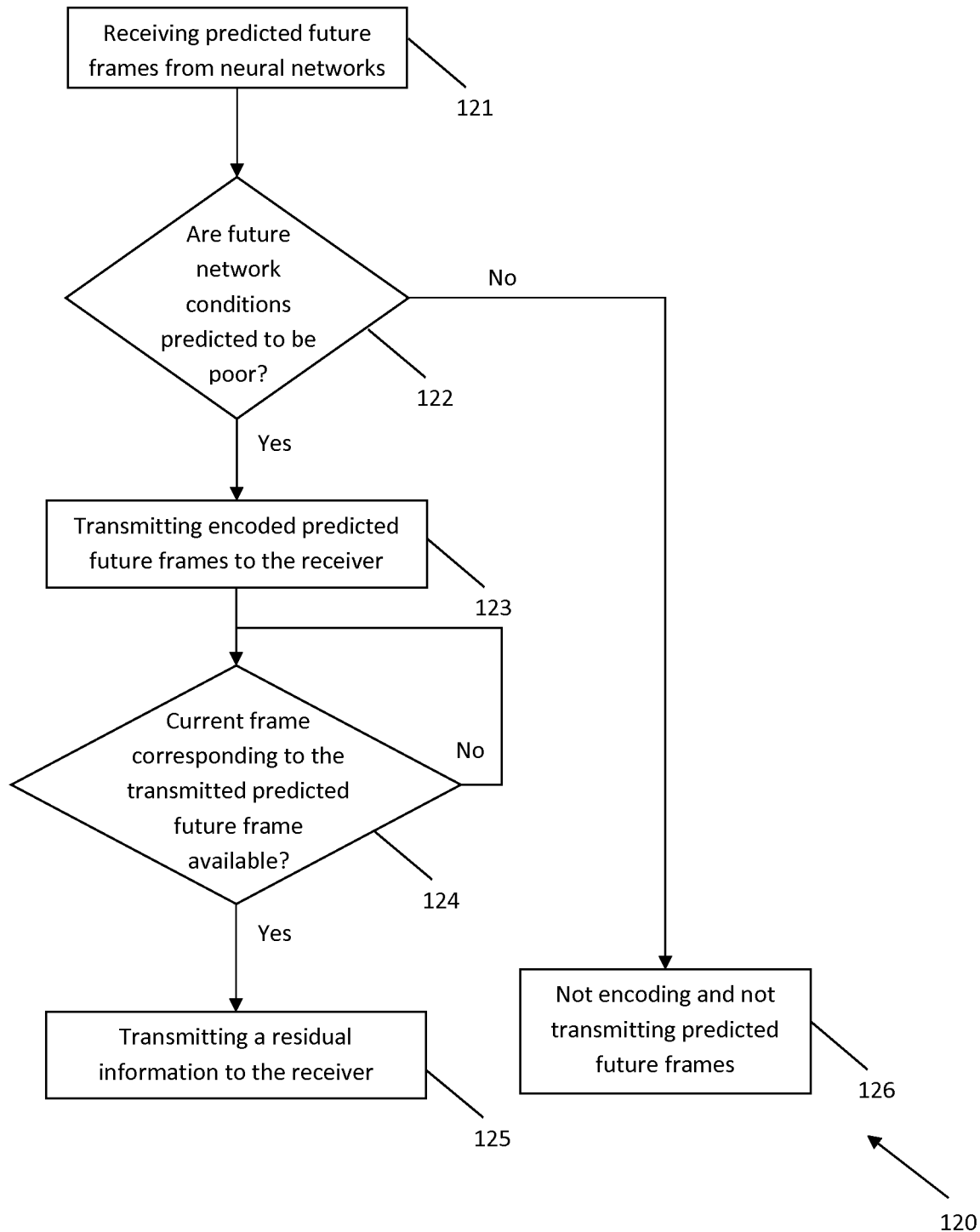
FIG. 12 is a flow chart showing an algorithm in accordance with an example embodiment.

FIG. 12 is a flow chart showing an algorithm, indicated generally by the reference numeral 120, in accordance with an example embodiment. At operation 121, video processing unit 32 obtains predicted future frames corresponding to a current frame from the neural networks, similar to neural networks 33. At operation 122, video processing unit 32 determines whether network conditions are predicted or expected to be poor in the near future. If the network conditions are not predicted or not expected to be poor, at operation 126, the predicted future frames are not transmitted to receiver 6. If the network conditions are predicted or expected to be poor, the predicted future frames are encoded and the encoded predicted future frames are transmitted to receiver 6 at operation 123. At operation 124, video processing unit 32 determines whether a current frame corresponding to one of the predicted future frames is available from the video capturing device 31. When the current frame corresponding to one of the predicted future frames is available, the video processing unit 32 computes residual information and transmits the residual information to receiver 6 at operation 125. The residual information contains a difference between the current frame and the previously transmitted corresponding predicted future frame.

In one alternative, operations 123-125 may be performed even if the network conditions are not predicted or expected to be poor. The predicted future frames may be transmitted to the receiver 6 in order to increase redundancy and reduce the chances of any missing frames at the receiver side.

Figure 13:
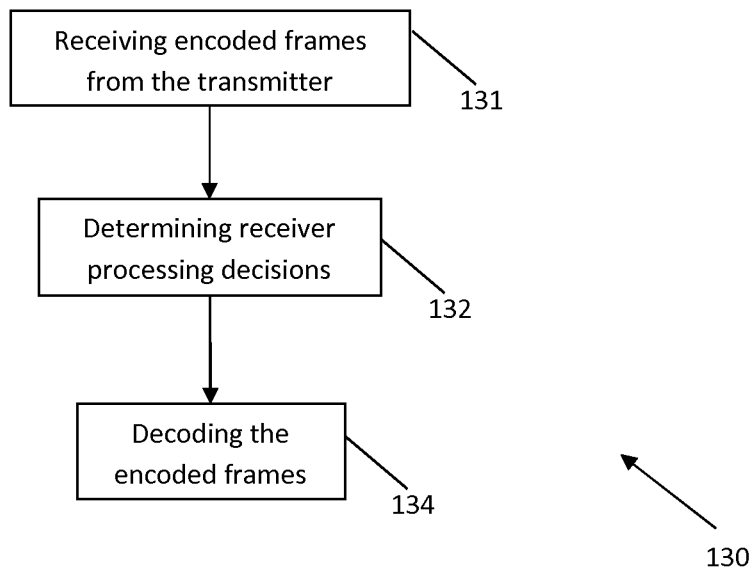
FIG. 13 is a flow chart showing an algorithm in accordance with an example embodiment.

FIG. 13 is a flow chart showing an algorithm, indicated generally by the reference numeral 130, in accordance with an example embodiment. Algorithm 130 represents a process carried out at a receiver, similar to receiver 6. At operation 131, receiver 6 receives encoded frames from a transmitter, similar to transmitter 2. At operation 132, a video processing unit at the receiver 6 determines receiver processing decisions based at least partially on a predicted output of neural networks and transmitter processing decisions. The transmitter processing decisions may be similar to the processing decisions determined by video processing unit 32 at operation 54 of algorithm 50, FIG. 5. At operation 134, a decoder at the receiver 6 decodes the encoded frames based on the receiver processing decisions. The transmitter processing decisions may be included in the signalling information received by receiver 6. The receiver processing decisions may comprise information of a chosen decoding method. For example, the decoder may decode the received encoded frames differently based on whether the received encoded frames include a current frame, a current frame and corresponding predicted future frames, a current frame corresponding to a previously transmitted predicted future frame, and/or a residual information.

In an example, as discussed earlier, the signalling information indicates to the receiver 6 that the received encoded frame should be stored in the receiver's memory in high quality, or that the received encoded frame is a reference frame. The receiver 6 may then determine that the received encoded frame may be useful for decoding certain one or more future frames and may therefore store the received frame in its memory in high quality.

Figure 14:
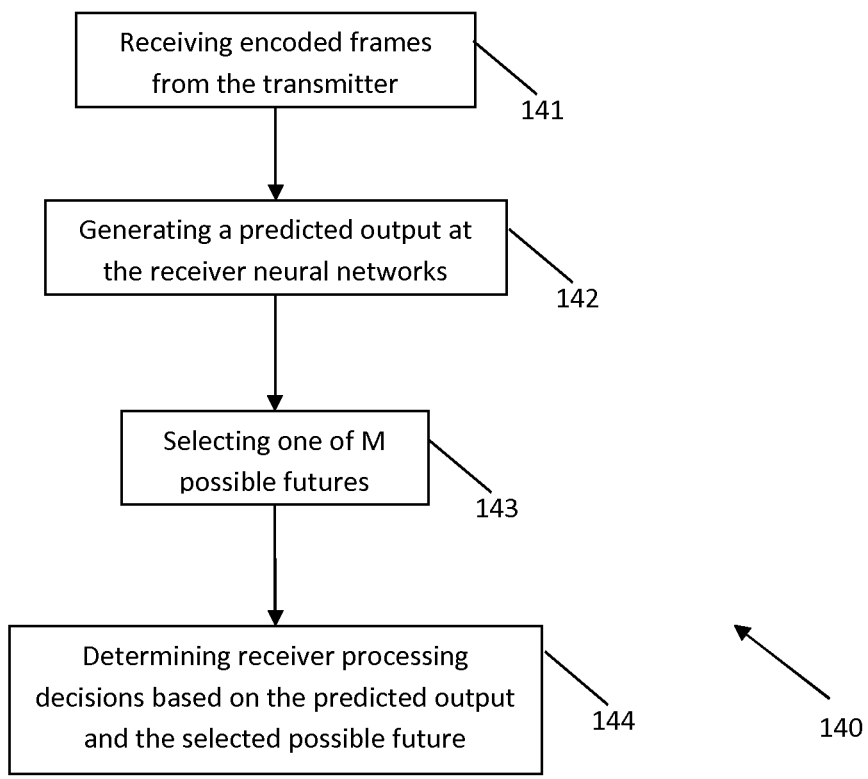
FIG. 14 is a flow chart showing an algorithm in accordance with an example embodiment.

FIG. 14 is a flow chart showing an algorithm, indicated generally by the reference numeral 140, in accordance with an example embodiment. Algorithm 140 represents a process carried out at a receiver, similar to receiver 6. In this example embodiment, the receiver 6 comprises neural networks. At operation 141, receiver 6 receives encoded frames from transmitter 2. At operation 142, a predicted output is generated at receiver neural networks. The predicted output comprises a plurality of predicted future frames. The plurality of predicted future frames may comprise a plurality of sets of predicted future frames corresponding to a plurality of possible futures. At operation 143, one possible future, for example a first set of predicted future frames, of the plurality of possible futures is selected based on context information received from transmitter 2 or based on past frames which were not predictions.

At operation 144, receiver processing decisions are determined based on the predicted output of the receiver neural networks and based on the first set of predicted future frames. The encoded frames are then processed according to the receiver processing decisions. The receiver processing decisions may comprise a selected decoding method such that the encoded frames are decoded using the selected decoding method.

In an example embodiment, the transmitter 2 does not transmit the predicted future frames to receiver 6, as the receiver also comprises the same number of plurality of neural networks as the transmitter. However, as the receiver 6 is capable of only obtaining frames that have been encoded and then decoded, the neural networks at both transmitter and receiver sides need to use the encoded-decoded frames as input for the future prediction. This guarantees that there are no mismatches between what is done at the transmitter and at the receiver.

There are various ways for the receiver 6 to select the first set of predicted future frames from the plurality of possible futures at operation 143. In one example, the receiver does not have information of the future frames (real future frames), unless the future frames are received from the transmitter. Thus, if network conditions are poor, but connection between the transmitter and the receiver is not dropped, the transmitter may include information in the signalling information about which of the plurality of sets of predicted future frames should be selected. Alternatively or in addition, the transmitter may provide context information to the receiver about current frames which were previously predicted as future frames at the receiver's side. The receiver 6 may also use the context information to update the neural networks. Context information preferably comprises smaller amount of data, i.e. requiring less bits, than whole frames. Examples of context information are the object and scene classes present in the frames, or more fine-grained information such as a semantic segmentation mask. The context information is input to the receiver neural networks together with the past input frames in order to update or condition the receiver neural networks. This way, the receiver neural networks will have some constraints in generating the future, and such constraints come from the real-world, so the future prediction will be closer to the reality.

In another example, the receiver neural networks may generate the predicted future frames, but the transmitter 2 may send the residual information comprising the difference between the current frame and the predicted future frames.

In another example, the receiver 6 may select the first set of predicted future frames without any information from the transmitter. Each set of predicted future frames may be generated by a different receiver neural network. Receiver 6 may select a receiver neural network by providing past frames, whose following future frames are already known, as inputs to all the receiver neural networks. A neural network, which generates a first set of predicted future frames that is closest to the real following future frames, is selected for future predictions.

Therefore, the first set of predicted future frames is selected for further processing. For determining which neural network generates a set of predicted future frames that are closest to the real following future frames, an error value can be derived for example by computing the MSE between the real following frames and the set of predicted future frames. The motivation for this approach is that a neural network which has performed well in predicting the latest few frames is likely to predict well also in the future. This approach would require that the receiver stores in a buffer the latest N_eval=N_input+N_GT, where N_input is the number of input past frames to the network to be evaluated, and N_GT is the number of real following frames (ground-truth frames) or equivalently the number of future frames to be predicted.

By way of example, video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner).

Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area: $C=D+\lambda R$, where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces.

Slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring block may be regarded as unavailable for intra prediction, if the neighbouring block resides in a different slice.

In some coding systems, such as HEVC, a picture can be partitioned in tiles, which are rectangular and contain an integer number of blocks, such as CTUs in HEVC. The partitioning to tiles may form a grid that may be characterized by a list of tile column widths and a list of tile row heights. Tiles are ordered in the bitstream consecutively in the raster scan order of the tile grid. A tile may contain an integer number of slices, or a slice may contain an integer number of tiles. The blocks (such as CTUs in HEVC) may be scanned in encoding and decoding tile-wise in the raster scan order of blocks, and tiles may be scanned in raster scan order along the tile grid.

In wavefront parallel processing (WPP) each block row (such as CTU row in HEVC) of a slice can be encoded and decoded in parallel. When WPP is used, the state of the entropy codec at the beginning of a block row is obtained from the state of the entropy codec of the block row above after processing the second block of that row. Consequently, block rows can be processed in parallel with a delay of 2 blocks per each block row.

Figure 15:
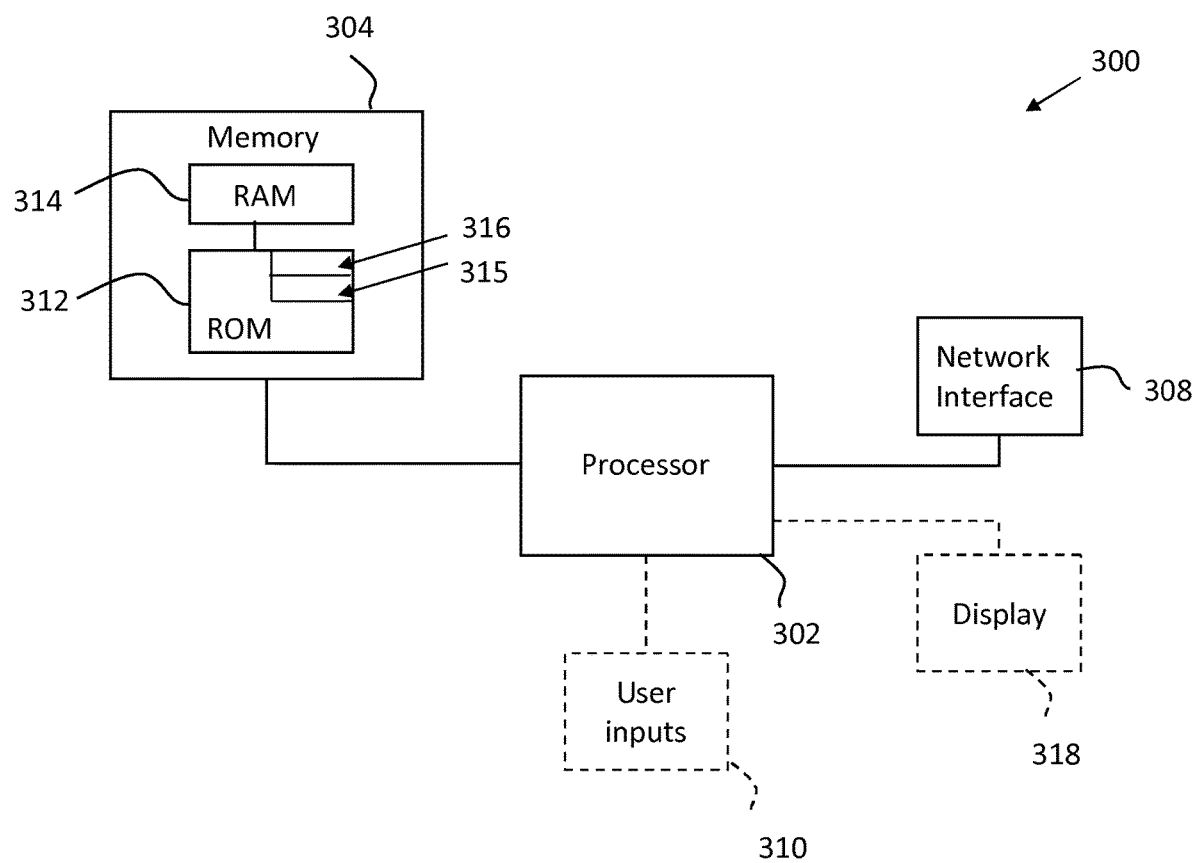
FIG. 15 is a block diagram of components of a system in accordance with an exemplary embodiment.

For completeness, FIG. 15 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 50, 70, 80, 90, 110, 120, 130, and 140 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16A:
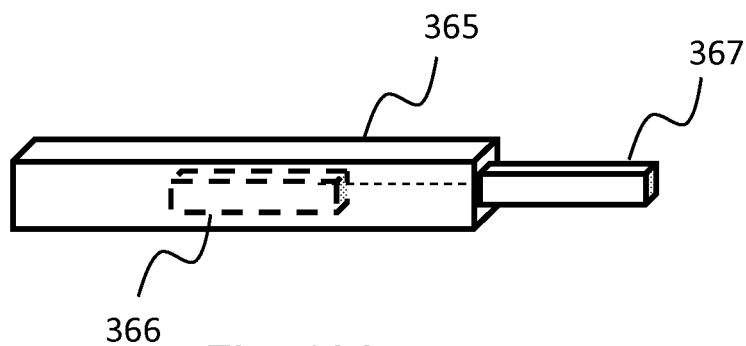
FIGS. 16A and 16B show tangible media, respectively a removable non-volatile memory unit and a compact disc (CD) storing computer-readable code which when run by a computer perform operations according to embodiments.
Figure 16B:
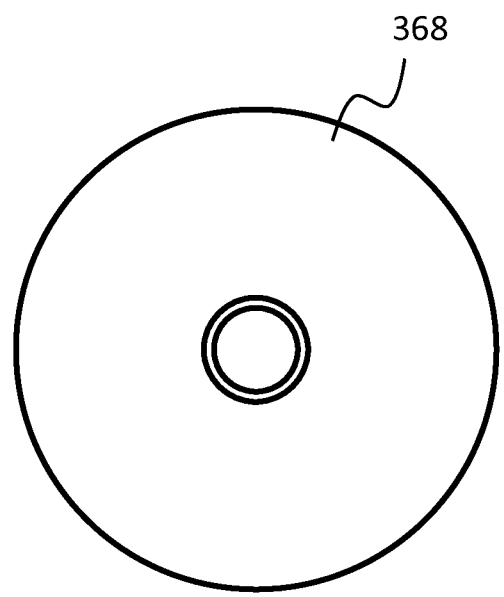

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 5, 7, 8, 9, 11, 12, 13 and 14 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory including computer program code for at least one or more programs, the at least one memory and the computer program code configured to, with the at least one processor, cause the apparatus at least to:
   obtain or receive video data;
   provide at least one of a current frame or one or more previous frames of the video data to an input of a neural network;
   generate a predicted output at, or based on, an output of the neural network, wherein the predicted output comprises at least one of one or more predicted future frames of the video data or predicted properties of one or more predicted future frames of the video data;
   determine one or more processing decisions based, at least in part, on the predicted output, at least by determining an encoding method for at least the current frame of the video data based at least on the predicted output; and
   process the current frame of the video data at least partially according to the one or more processing decisions, at least by encoding at least the current frame using the determined encoding method.

2. The apparatus as claimed in claim 1, wherein the at least one memory and the computer program code are further configured to, with the at least one processor, cause the apparatus at least to: transmit the processed current frame of the video data to a receiver.

3. The apparatus as claimed in claim 2, wherein the at least one memory and the computer program code are further configured to, with the at least one processor, cause the apparatus at least to: encode using the determined encoding method one or more predicted future frames of the video data for the transmission to the receiver.

4. The apparatus as claimed in claim 1, wherein to process the current frame of the video data, the at least one memory and the computer program code are further configured to, with the at least one processor, cause the apparatus at least to: generate residual information based on a difference between the current frame of the video data and an earlier prediction of the current frame.

5. The apparatus as claimed in claim 4, wherein the at least one memory and the computer program code are further configured to, with the at least one processor, cause the apparatus at least to: transmit said residual infouiiation to the receiver.

6. The apparatus as claimed in claim 1, wherein to determine the one or more processing decisions, the at least one memory and the computer program code are further configured to, with the at least one processor, cause the apparatus at least to: determine whether or not to store the current frame of the video data as a reference frame at least by determining, using the predicted output, that differences between the current frame and at least one of the one or more predicted future frames are below a threshold and, in response, storing the current frame as the reference frame.

7. The apparatus as claimed in claim 1, wherein the at least one memory and the computer program code are further configured to, with the at least one processor, cause the apparatus at least to: train the neural network.

8. The apparatus as claimed in claim 1, wherein the one or more predicted future frames of the video data comprise a plurality of sets of future frames, wherein each set comprises one or more predicted future frames and wherein the predicted output is generated based on whichever of the plurality of sets is determined to be a most plausible set based on applying past frames to generate the plurality of sets and selecting the set that is closest to real future frames that followed the past frames.

9. The apparatus as claimed in claim 1, wherein the video data comprises live video.

10. The apparatus as claimed in claim 1, wherein the at least one memory and the computer program code are further configured to, with the at least one processor, cause the apparatus at least to: transmit information indicating data included in the processed current frame of the video data, wherein said information includes one or more of: that the processed current frame comprises the current frame of the video data; that the processed current frame comprises the current frame of the video data and one or more predicted future frames of the video data; that the processed current frame corresponds to a previously transmitted predicted future frame of the video data; or that the processed current frame comprises a residual between the current frame of the video data and a previous predicted future frame of the video data.

11. The apparatus as claimed in claim 1, wherein the at least one memory and the computer program code are further configured to, with the at least one processor, cause the apparatus at least to: determine receiver processing decisions based, at least in part, on the predicted output and the processing decisions; and decode the processed current frame of the video data according to the receiver processing decisions.

12. A method comprising:
obtaining or receiving video data;
providing at least a current frame or one or more previous frames of the obtained or received video data to an input of a neural network;
generating a predicted output at an output of the neural network, wherein the predicted output comprises at least one of one or more predicted future frames of the video data and predicted properties of one or more future frames of the video data;
determine one or more processing decisions based, at least in part, on the predicted output, at least by detetermining an encoding method for at least the current frame of the video data based at least on the predicted output; and
process the current frame of the video data at least partially according to the one or more processing decisions, at least by encoding at least the current frame using the determined encoding method.

13. The method according to claim 12 further comprising transmitting the processed current frame of the video data to a receiver.

14. The method according to claim 13, further comprising encoding using the determined encoding method one or more predicted future frames of the video data for the transmission to the receiver.

15. The method as claimed in claim 13, wherein to process the current frame of the video data, the method further comprises: generating residual information based on a difference between the current frame of the video data and an earlier prediction of the current frame.

16. The method according to claim 13, further comprising transmitting said residual information to the receiver.

17. The method according to claim 12, wherein processing the current frame of the video data comprises: generating residual information based on a difference between the current frame of the video data and an earlier prediction of the current frame.

18. The method according to claim 12, wherein the one or more predicted future frames of the video data comprise a plurality of sets of future frames, wherein each set comprises one or more predicted future frames and wherein the predicted output is generated based on whichever of the plurality of sets is determined to be a most plausible set based on applying past frames to generate the plurality of sets and selecting the set that is closest to real future frames that followed the past frames.

19. A non-transitory computer program comprising instructions for causing an apparatus to perform at least the following:
obtaining or receiving video data;
providing at least a current frame or one or more previous frames of the obtained or received video data to an input of a neural network;
generating a predicted output at an output of the neural network, wherein the predicted output comprises at least one of one or more predicted future frames of the video data and predicted properties of one or more future frames of the video data;
determine one or more processing decisions based, at least in part, on the predicted output, at least by determining an encoding method for at least the current frame of the video data based at least on the predicted output; and
process the current frame of the video data at least partially according to the one or more processing decisions, at least by encoding at least the current frame using the determined encoding method.

* * * * *